United States Patent
Lee (10) Patent No.: US 8,355,904 B2
(45) Date of Patent: Jan. 15, 2013

(54) APPARATUS AND METHOD FOR DETECTING SENTENCE BOUNDARIES

(75) Inventor: Chung Hee Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 320 days.

(21) Appl. No.: 12/780,385

(22) Filed: May 14, 2010

(65) Prior Publication Data
US 2011/0087484 A1    Apr. 14, 2011

(30) Foreign Application Priority Data
Oct. 8, 2009    (KR) ........................ 10-2009-0095775

(51) Int. Cl.
*G06F 17/27* (2006.01)
*G06F 17/20* (2006.01)
*G06F 17/21* (2006.01)

(52) U.S. Cl. .................... 704/9; 704/1; 704/10

(58) Field of Classification Search ................. 704/1, 8, 704/9; 715/257, 271
See application file for complete search history.

(56) References Cited

U.S. PATENT DOCUMENTS

| | | | |
|---|---|---|---|
| 7,809,552 B2 * | 10/2010 | Pan et al. ........................ | 704/9 |
| 7,865,356 B2 * | 1/2011 | Weng et al. ..................... | 704/9 |
| 8,131,546 B1 * | 3/2012 | Zoellner ....................... | 704/248 |
| 2006/0031304 A1 * | 2/2006 | Bagga et al. .................. | 709/206 |
| 2007/0192309 A1 * | 8/2007 | Fischer et al. .................. | 707/5 |
| 2009/0063150 A1 | 3/2009 | Nasukawa et al. | |

FOREIGN PATENT DOCUMENTS

| | | |
|---|---|---|
| KR | 1020010075848 | 8/2001 |
| KR | 1020090046280 | 5/2009 |

OTHER PUBLICATIONS

Reynar et al. "A Maximum Entropy Approach to Identifying Sentence Boundaries". in Proc. of the fifth conference on Applied Natural Language Professoing 1997, pp. 16-19.*
Lim, Heui-Seok et al., "Korean Sentence Boundary Detection Using Memory-based Machine Learning," The Korea Contents Association, vol. 4(4):133-139 (2004).
Park, Su Hyuk et al., "Sentence Boundary Detection Using Machine Learning Techniques," Korea Information Processing Society, vol. 15(1):1-4 (2008).

* cited by examiner

*Primary Examiner* — Jesse Pullias
(74) *Attorney, Agent, or Firm* — Nelson Mullins Riley & Scarborough LLP; EuiHoon Lee, Esq.

(57) ABSTRACT

Provided are an apparatus and a method for detecting sentence boundaries. The apparatus includes a sentence boundary candidate extracting unit, a document context analyzing unit, a sentence boundary candidate classifying unit, a sentence generating unit. The sentence boundary candidate extracting unit extracts a sentence boundary candidate from an input document. The document context analyzing unit extracts features from information on preceding and following contexts of the sentence boundary candidate. The features are used in two or more statistical algorithms. The sentence boundary candidate classifying unit classifies whether the sentence boundary candidate is a sentence boundary or not, using the features and the two or more statistical algorithms. The sentence generating unit extracts sentence units from the document based on a result of the classification of whether the sentence boundary candidate is a sentence boundary or not.

18 Claims, 6 Drawing Sheets

APPARATUS AND METHOD FOR DETECTING SENTENCE BOUNDARIES

CROSS-REFERENCE TO RELATED APPLICATIONS

This application claims priority under 35 U.S.C. §119 to Korean Patent Application No. 10-2009-0095775, filed on Oct. 8, 2009, in the Korean Intellectual Property Office, the disclosure of which is incorporated herein by reference in its entirety.

TECHNICAL FIELD

The following disclosure relates to an apparatus and a method for detecting sentence boundaries, and in particular, to an apparatus and a method for detecting sentence boundaries based on a hybrid method.

BACKGROUND

The sentence boundary detection technology means a technology of dividing texts included in a corresponding document into sentence units. Hereinafter, related-art technologies pertaining to this field will be introduced.

Most of sentence boundary detection methods that have so far been studied or published detect a sentence boundary using punctuation marks, blanks, or n-grams that appear at the beginning and the end of the sentence. Some of the sentence boundary detection methods are dependent on languages because using results of language analysis. Therefore, related-arts have problems such that the sentence boundary detection performance may be significantly deteriorated on user documents such as web documents that have many word-spacing errors and no punctuation marks, and have linguistic dependency in that the methods can not be applied to other languages.

SUMMARY

In one general aspect, an apparatus for detecting sentence boundaries includes: a sentence boundary candidate extracting unit extracting a sentence boundary candidate from an input document; a document context analyzing unit extracting features from information on preceding and following contexts of the sentence boundary candidate, the features being used in two or more statistical algorithms; a sentence boundary candidate classifying unit classifying whether the sentence boundary candidate is a sentence boundary or not, using the features and the two or more statistical algorithms; and a sentence generating unit extracting sentence units from the document based on a result of the classification of whether the sentence boundary candidate is a sentence boundary or not.

The document context analyzing unit may include: a punctuation mark feature extractor extracting information on whether the sentence boundary candidate is a punctuation mark; a blank feature extractor extracting information on whether a following syllable of the sentence boundary candidate is a blank; a syllable feature extractor extracting information on first to n-th preceding syllables of the sentence boundary candidate and information on first to n-th following syllables of the sentence boundary candidate; a token feature extractor extracting information on first to n-th preceding tokens of the sentence boundary candidate and information on first to n-th following tokens of the sentence boundary candidate; and a quotation mark feature extractor extracting information on the number of quotation marks existing between beginning of a target sentence and the sentence boundary candidate.

The two or more statistical algorithms may include at least two of a Maximum Entropy (ME) algorithm, a Support Vector Machine (SVM) algorithm, and a Critical Random Field (CRF) algorithm. The sentence boundary candidate classifying unit may include at least two of: an ME-based classifier classifying whether the sentence boundary candidate is a sentence boundary or not, using the features extracted by the document context analyzing unit and the ME algorithm; an SVM-based classifier classifying whether the sentence boundary candidate is a sentence boundary or not, using the features extracted by the document context analyzing unit and the SVM algorithm; a CRF-based classifier classifying whether the sentence boundary candidate is a sentence boundary or not, using the features extracted by the document context analyzing unit and the CRF algorithm, and an optimum classification selector selecting an optimum classification result from two or more classification results of the ME-based classifier, the SVM-based classifier, and the CRF-based classifier as a final classification result, using the features extracted by the document context analyzing unit.

In another general aspect, an apparatus for detecting sentence boundaries includes: a sentence boundary candidate extracting unit extracting a sentence boundary candidate from an input document; a document context analyzing unit extracting features from information on preceding and following contexts of the sentence boundary candidate, the features being used in a statistical algorithm; a sentence boundary candidate classifying unit classifying whether the sentence boundary candidate is a sentence boundary or not, using the features and the statistical algorithm; an error post-processing unit correcting an error based on a predetermined rule with respect to the classified sentence boundary candidate; and a sentence generating unit extracting sentence units from the document based on a result of the classification of whether the sentence boundary candidate is a sentence boundary or not corrected by the error post-processing unit.

In still another general aspect, an apparatus for detecting sentence boundaries includes: a sentence boundary candidate extracting unit extracting a sentence boundary candidate from an input document; a document context analyzing unit extracting features from information on preceding and following contexts of the sentence boundary candidate, the features being used in a statistical algorithm; a sentence boundary candidate classifying unit classifying whether the sentence boundary candidate is a sentence boundary or not, using the features and the statistical algorithm; and a sentence generating unit extracting sentence units from the document based on a result of the classification of whether the sentence boundary candidate is a sentence boundary or not, wherein the sentence boundary candidate includes at least one of punctuation marks used in sentence termination, sentence-ending elements of predicates used in the sentence termination, and other sentence-terminating syllables extracted from a list of all syllables used in the sentence termination and pre-extracted from learning data tagged with sentence termination symbols.

In even another general aspect, a method for detecting sentence boundaries includes: extracting a sentence boundary candidate from an input document; extracting features used in two or more statistical algorithms from information on preceding and following contexts of the sentence boundary candidate; classifying whether the sentence boundary candidate is a sentence boundary or not, using the features and the two or more statistical algorithms; and extracting sentence units from the document based on a result of the classification of whether the sentence boundary candidate is a sentence boundary or not.

The classifying of whether the sentence boundary candidate is a sentence boundary or not may include: classifying whether the sentence boundary candidate is a sentence boundary using the extracted features and an ME algorithm; classifying whether the sentence boundary candidate is a sentence boundary using the extracted features and an SVM algorithm; classifying whether the sentence boundary candidate is a sentence boundary using the extracted features and a CRF algorithm; and selecting an optimum classification result from classification results of the ME-based classifier, the SVM-based classifier, and the CRF-based classifier as a final classification result, using the extracted features.

The correcting of an error may include: detecting whether the sentence boundary candidate is a post-processing target or not, based on the predetermined rule; and changing the classification result of the sentence boundary candidate into the opposite when the sentence boundary candidate is detected as a post-processing target in the detecting of whether the sentence boundary candidate is a post-processing target or not.

Other features and aspects will be apparent from the following detailed description, the drawings, and the claims.

DETAILED DESCRIPTION OF EMBODIMENTS

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
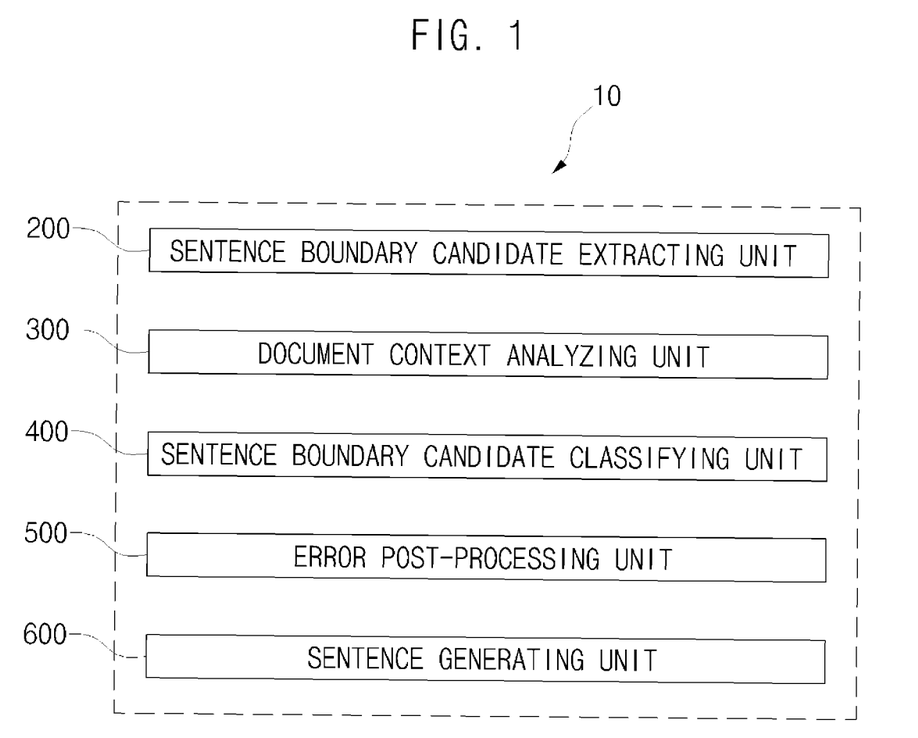
FIG. 1 is a diagram illustrating an apparatus for detecting sentence boundaries according to an exemplary embodiment.

Hereinafter, preferred embodiments will be described in detail with reference to the accompanying drawings. FIG. 1 is a diagram illustrating an apparatus for detecting sentence boundaries according to an exemplary embodiment.

Referring to FIG. 1, an apparatus 10 for detecting sentence boundaries may include a sentence boundary candidate extracting unit 200, a sentence context analyzing unit 300, a sentence boundary candidate classifying unit 400, an error post-processing unit 500, and a sentence generating unit 600.

The sentence boundary candidate extracting unit 200 may extract candidate that may be sentence boundaries from an input document of the sentence boundary detection apparatus 10 to deliver the candidate to the document context analyzing unit 300. The document context analyzing unit 300 may analyze information on the preceding and following contexts of the extracted sentence boundary candidate to extract features used for classification algorithms. The sentence boundary candidate classifying unit 400 may classify whether the corresponding sentence boundary candidate can be a sentence boundary or not, using the features extracted from the document context analyzing unit 300. The error post-processing unit 500 may correct errors of the result from the classification of the sentence boundary candidate classifying unit 400 based on rules. The sentence generating unit 600 may generate sentence units of a document, using the sentence boundaries that are finally detected.

Hereinafter, respective components in a sentence boundary detection apparatus 10 according to an exemplary embodiment will be described in detail with reference to the accompanying drawings. FIGS. 2 to 5 are diagrams illustrating a sentence boundary candidate extracting unit 200, a document context analyzing unit 300, a sentence boundary candidate classifying unit 400, and an error post-processing unit 500 of an apparatus for detecting sentence boundaries according to an exemplary embodiment, respectively.

Figure 2:
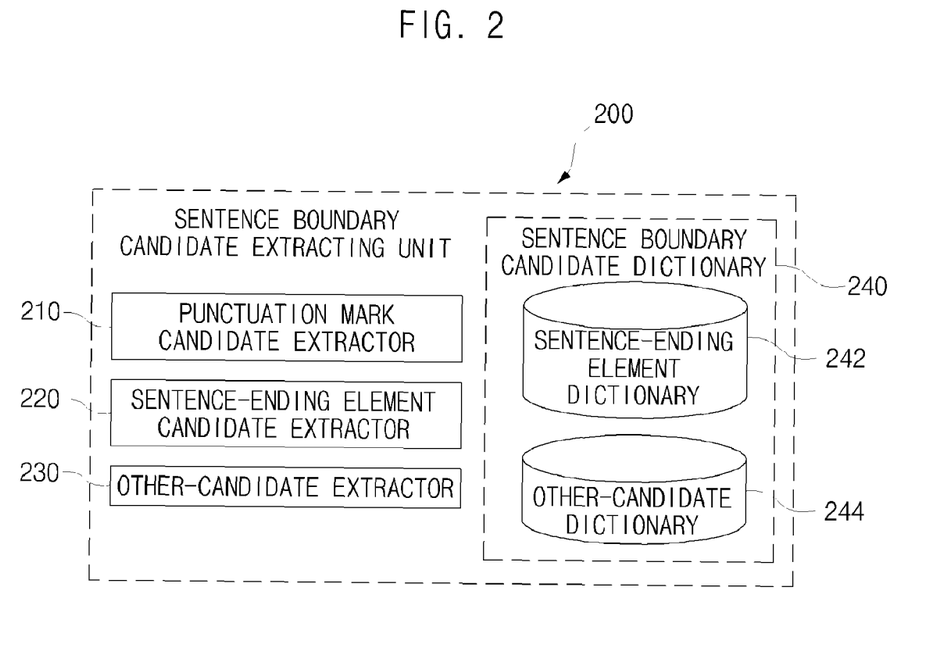
FIGS. 2 to 5 are diagrams illustrating a sentence boundary candidate extracting unit, a document context analyzing unit, a sentence boundary candidate classifying unit, and an error post-processing unit of an apparatus for detecting sentence boundaries according to an exemplary embodiment, respectively.

Referring to FIG. 2, the sentence boundary candidate extracting unit 200 may include a punctuation mark candidate extractor 210, a sentence-ending element candidate extractor 220, an other-candidate extractor 230, and a sentence boundary candidate dictionary 240.

Punctuation marks that can be used in sentence termination may be extracted as sentence boundary candidate by the punctuation mark candidate extractor 210. For example, the period (.), question mark (?), and exclamation mark (!) may be extracted as the candidate. Sentence-ending elements that are used in the sentence termination may be extracted from endings of the predicates by the sentence-ending element candidate extractor 220. For example, In Korean language, fifteen sentence-ending elements may be extracted as the sentence-ending element candidate as follows.

Sentence-ending elements: Da, Ne, O, Eo, Ji, Na, Goon, Ra, Ni, Ga, Ka, Ge, Ja, Se, and Yo. (In Korean language,)

According to an exemplary embodiment, all syllables that are used in the sentence termination may be pre-extracted from learning data tagged with sentence termination symbols. Then, a result of the extraction may be stored in the sentence boundary candidate dictionary 240. The sentence boundary candidate dictionary 240 may include a sentence-ending element dictionary 242 storing the foregoing sentence endings and an other-candidate dictionary 244 storing other candidates used in the sentence termination.

The other-candidate extractor 230 may extract sentence boundary candidate based on a list stored in the other-candidate dictionary 244 of the sentence boundary candidate dictionary 240. Examples of the syllables used in the sentence termination may include the following syllables.

Sentence-Ending Syllables: Ga, Gak, Gan, Gam, . . . , Na, Nal, Nat, Nae, Nya, . . . , Da, Dan, Dam, Dab, Dang, Dae, Deon, De, . . . , Ra, Rak, Ran, Ral, Ram, Rae, Raem, Rya, Reul, . . . , Ma, Mak, Man, . . . , Heu, Heuk, Heun, Heui, Hing.

Figure 3:
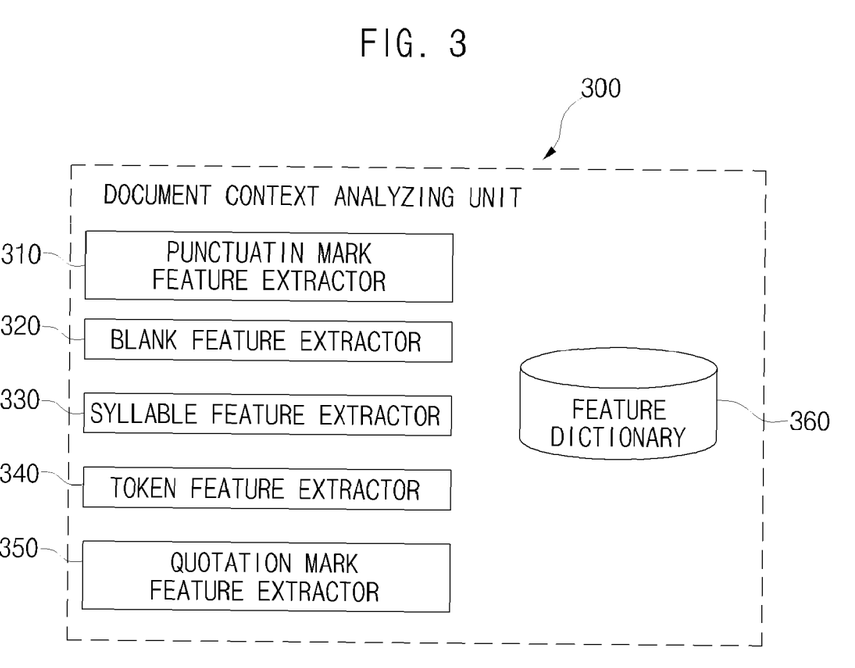

FIG. 3 illustrates the configuration of the document context analyzing unit 300 analyzing the context of a document to extract features used in statistical algorithms. The document context analyzing unit 300 may include a punctuation mark feature extractor 310, a blank feature extractor 320, a syllable feature extractor 330, a token feature extractor 340, a quotation mark feature extractor 350, and a feature dictionary 360.

The punctuation mark feature extractor 310 may extract information on punctuation marks of corresponding sentence boundary candidate. The blank feature extractor 320 may extract information on blanks of next syllables of the sentence boundary candidates. The syllable feature extractor 330 may extract information first to n-th (n is a natural number) preceding syllables of the sentence boundary candidate and information on first to n-th following syllables of the sentence boundary candidate. The token feature extractor 340 may extract information on first to n-th preceding tokens of the sentence boundary candidate and information on first to n-th following tokens of the sentence boundary candidate. The quotation mark feature extractor 350 may extract information on the number of quotation marks that exist between a target sentence and a sentence boundary candidate. In this case, data registered in the feature dictionary 360 are used.

Figure 4:
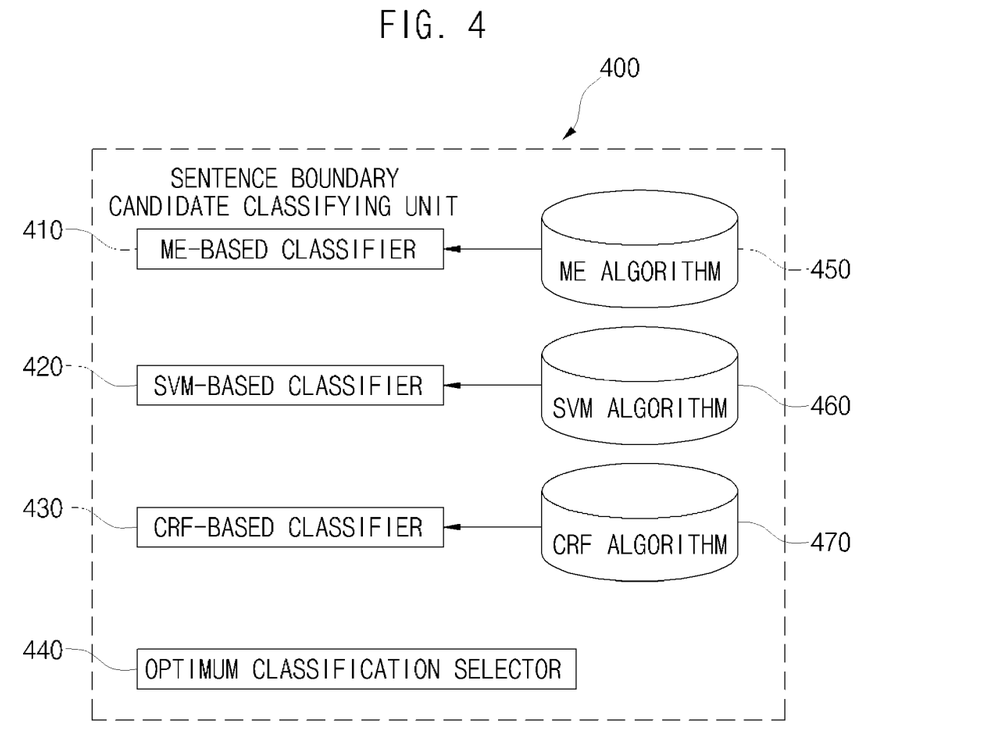

FIG. 4 illustrates the configuration of the sentence boundary candidate classifying unit 400. The sentence boundary candidate classifying unit 400 may include a Maximum Entropy (ME)-based classifier 410 and an ME algorithm database 450, a Support Vector Machine (SVM)-based classifier 420 and an SVM algorithm database 460, a Critical Random Field (CRF)-based classifier 430 and a CRF algorithm database 470, and an optimum classification selector 440.

Based on the features that are extracted by the document context analyzing unit 300, the ME-based classifier 410 may classify whether or not the sentence boundary candidate is a sentence boundary, using a ME algorithm. The SVM-based classifier 420 may classify whether or not the sentence boundary candidate is a sentence boundary, using a SVM algorithm. The CRF-based classifier 430 may classify whether or not the sentence boundary candidate is a sentence boundary, using a CRF algorithm.

The optimum classification selector 440 may select an optimum classification engine from three classification engines of ME, SVM and CRF using the features of a current sentence boundary candidate.

Since classification algorithm of ME, SVM, and CRF are used as an algorithm for selecting one engine from the three classification engines, and learning data for sentence boundary detection are still used for the learning of the classification algorithms, additional efforts can be minimized.

Final sentence boundary detection may be performed using the classification engine selected by the optimum classification selector 440, and then an optimum classification algorithm may be selected according to the context. Accordingly, the performance of the sentence boundary detection can be maximized.

Figure 5:
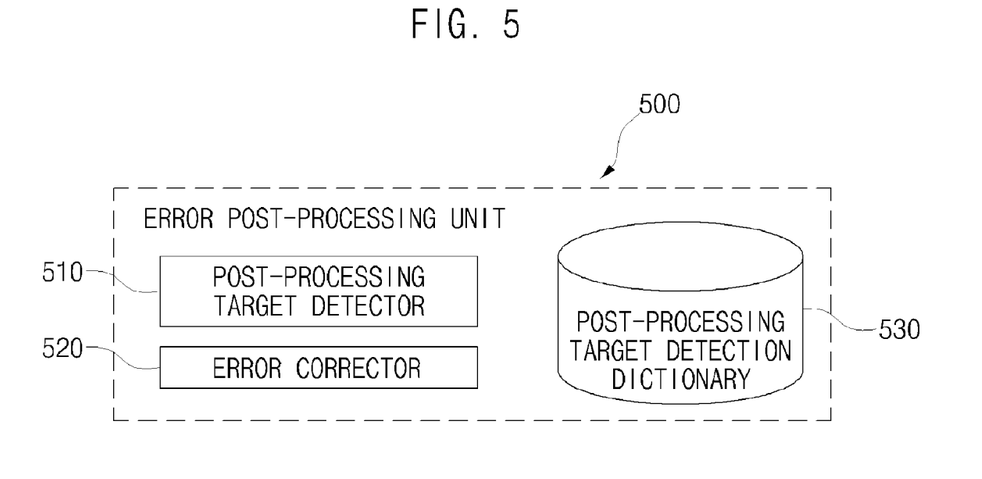

FIG. 5 illustrates the configuration of the error post-processing unit 500. The error post-processing unit 500 may include a post-processing target detector 510, an error corrector 520, and a post-processing target detection dictionary 530.

Even though the sentence boundary is detected through the selection of the optimum classification algorithm by the sentence boundary candidate classification unit 400, errors dependent on the learning data that is a limit of the classified statistical algorithm may exist. Such errors may be removed by the post-processing unit 500.

The post-processing target detector 510 may detect obvious classification errors that frequently occur in the statistical algorithms. The post-processing target detector 510 may detect a post-processing target using regular expressions built manually and stored in the post-processing target detection dictionary 530. The error corrector 520 may change the classification result into the opposite when the post-processing target is detected.

Figure 6:
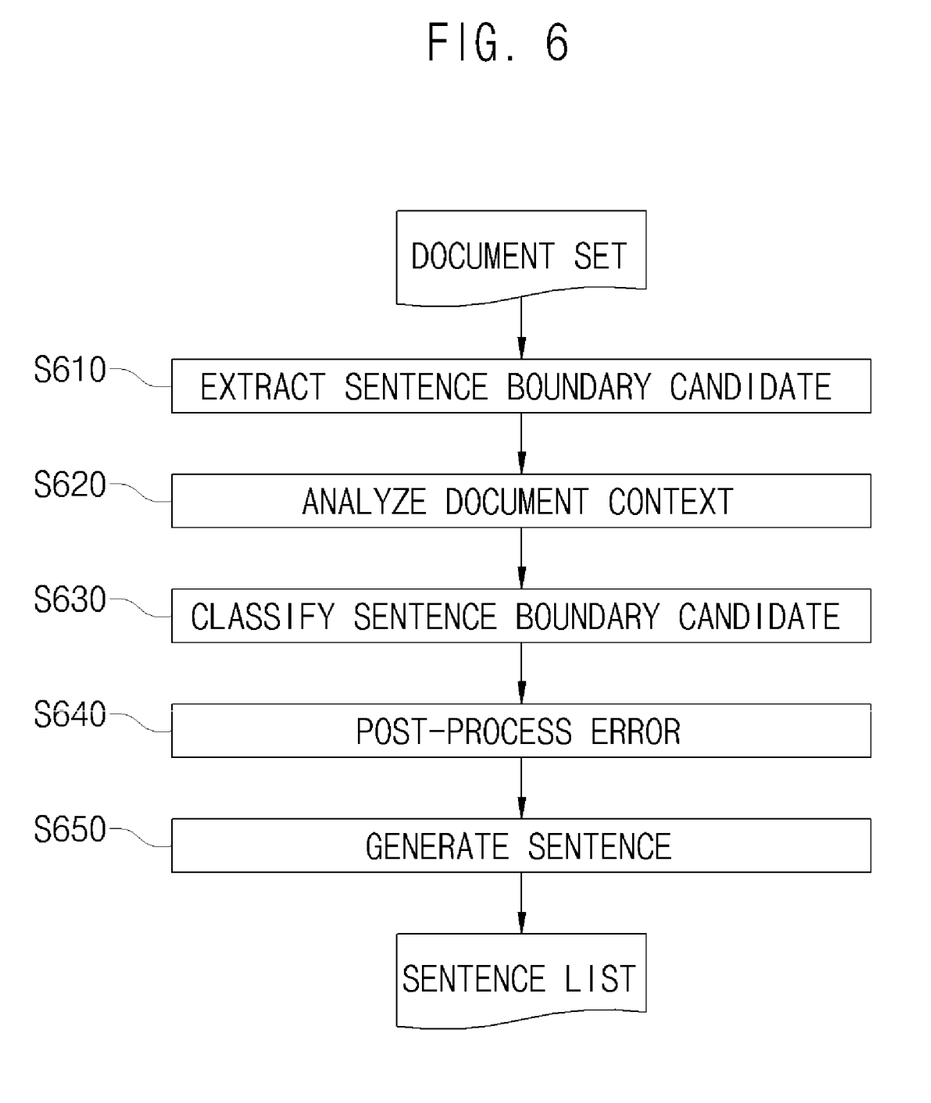
FIG. 6 is a diagram illustrating a method for detecting sentence boundaries according to an exemplary embodiment.

Hereinafter, a method for detecting a sentence boundary according to an embodiment will be described. FIG. 6 illustrates a sentence boundary detection method according to an embodiment.

Referring to FIG. 6, when a document set is inputted into a sentence boundary detection apparatus 10, in operation S610, a sentence boundary candidate may be extracted by a sentence boundary candidate extracting unit 200.

In operation S620, a document context analyzing unit 300 may analyze information on the preceding and following context of the sentence boundary candidate to extract features that are to be used for classification algorithms.

Next, it may be determined by the features extracted in operation S620 whether the corresponding sentence boundary candidate becomes a sentence boundary, and, in operation S630, a final sentence boundary may be classified from the sentence boundary candidate. Operation S630 may be performed by the sentence boundary candidate classifying unit 400. As described in FIG. 4, the sentence boundary candidate may be classified according to an optimum classification among ME, SVM, and CRF-based classifications.

In operation S640, an error post-processing may be performed on the classified sentence boundary candidate by an error post-processing unit 500, and thus a final sentence is generated in operation S650.

As a result of the sentence boundary detection, the document set inputted into the sentence boundary detection apparatus 10 may be converted into a list of divided sentences, and be provided.

The method for detecting sentence boundaries can also be embodied as computer readable codes on a computer-readable storage medium. The computer-readable storage medium is any data storage device that can store data which can be thereafter read by a computer system. Examples of the computer-readable storage medium include ROMs, RAMs, CD-ROMs, DVDs, magnetic tapes, floppy disks, registers, buffers, optical data storage devices, and carrier waves (such as data transmission through the Internet). The computer-readable storage medium can also be distributed over network coupled computer systems so that the computer readable codes are stored and executed in a distributed fashion. Also, functional programs, codes, and code segments for accomplishing the present invention can be easily construed by programmers skilled in the art to which the present invention pertains.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for detecting sentence boundaries, comprising:
   a sentence boundary candidate extracting unit extracting a sentence boundary candidate from an input document;
   a document context analyzing unit extracting features from information on preceding and following contexts of the sentence boundary candidate, the features being used in two or more statistical algorithms;
   a sentence boundary candidate classifying unit classifying whether the sentence boundary candidate is a sentence boundary or not, using the features and the two or more statistical algorithms; and a sentence generating unit extracting sentence units from the document based on a result of the classification of whether the sentence boundary candidate is a sentence boundary or not, wherein the document context analyzing unit comprises:

a punctuation mark feature extractor extracting information on whether the sentence boundary candidate is a punctuation mark;

a blank feature extractor extracting information on whether a following syllable of the sentence boundary candidate is a blank;

a syllable feature extractor extracting information on first to n-th preceding syllables of the sentence boundary candidate and information on first to n-th following syllables of the sentence boundary candidate;

a token feature extractor extracting information on first to n-th preceding tokens of the sentence boundary candidate and information on first to n-th following tokens of the sentence boundary candidate; and a quotation mark feature extractor extracting information on a number of quotation marks existing between a beginning of a target sentence and the sentence boundary candidate.

2. The apparatus of claim 1, wherein the sentence boundary candidate extracting unit comprises a punctuation mark candidate extractor extracting a punctuation mark as the sentence boundary candidate, the punctuation mark being used as a sentence ending.

3. The apparatus of claim 2, wherein the sentence boundary candidate extracting unit further comprises a sentence-ending element candidate extractor extracting sentence-ending elements from endings of predicates as the sentence boundary candidate, the sentence-ending elements being used in the sentence ending.

4. The apparatus of claim 2, wherein the sentence boundary candidate extracting unit further comprises an other-candidate extractor pre-extracting all syllables used in sentence termination from learning data tagged with sentence termination symbols, and extracting the sentence boundary candidate from a list of the pre-extracted syllables.

5. The apparatus of claim 1, wherein the two or more statistical algorithms comprises at least two of a Maximum Entropy (ME) algorithm, a Support Vector Machine (SVM) algorithm, and a Critical Random Field (CRF) algorithm, and the sentence boundary candidate classifying unit comprises at least two of:

an ME-based classifier classifying whether the sentence boundary candidate is a sentence boundary or not, using the features extracted by the document context analyzing unit and the ME algorithm;

an SVM-based classifier classifying whether the sentence boundary candidate is a sentence boundary or not, using the features extracted by the document context analyzing unit and the SVM algorithm;

a CRF-based classifier classifying whether the sentence boundary candidate is a sentence boundary or not, using the features extracted by the document context analyzing unit and the CRF algorithm, and an optimum classification selector selecting an optimum classification result from two or more classification results of the ME-based classifier, the SVM-based classifier, and the CRF-based classifier as a final classification result, using the features extracted by the document context analyzing unit.

6. The apparatus of claim 1, further comprising an error post-processing unit correcting an error based on a predetermined rule with respect to the classified sentence boundary candidate, wherein the sentence generating unit extracts the sentence units from the document based on the classification result corrected by the error post-processing unit.

7. The apparatus of claim 6, wherein the error post-processing unit comprises:

a post-processing target detector detecting whether the sentence boundary candidate is a post-processing target or not, based on the predetermined rule; and an error corrector changing the classification result of the sentence boundary candidate into the opposite when the sentence boundary candidate is detected as a post-processing target.

8. An apparatus for detecting sentence boundaries, comprising:

a sentence boundary candidate extracting unit extracting a sentence boundary candidate from an input document;

a document context analyzing unit extracting features from information on preceding and following contexts of the sentence boundary candidate, the features being used in a statistical algorithm;

a sentence boundary candidate classifying unit classifying whether the sentence boundary candidate is a sentence boundary or not, using the features and the statistical algorithm;

an error post-processing unit correcting an error based on a predetermined rule with respect to the classified sentence boundary candidate; and a sentence generating unit extracting sentence units from the document based on a result of the classification of whether the sentence boundary candidate is a sentence boundary or not corrected by the error post-processing unit, wherein the document context analyzing unit comprises:

a punctuation mark feature extractor extracting information on whether the sentence boundary candidate is a punctuation mark;

a blank feature extractor extracting information on whether a following syllable of the sentence boundary candidate is a blank;

a syllable feature extractor extracting information on first to n-th preceding syllables of the sentence boundary candidate and information on first to n-th following syllables of the sentence boundary candidate;

a token feature extractor extracting information on first to n-th preceding tokens of the sentence boundary candidate and information on first to n-th following tokens of the sentence boundary candidate; and a quotation mark feature extractor extracting information on a number of quotation marks existing between a beginning of a target sentence and the sentence boundary candidate.

9. An apparatus for detecting sentence boundaries, comprising:

a sentence boundary candidate extracting unit extracting a sentence boundary candidate from an input document;

a document context analyzing unit extracting features from information on preceding and following contexts of the sentence boundary candidate, the features being used in a statistical algorithm;

a sentence boundary candidate classifying unit classifying whether the sentence boundary candidate is a sentence boundary or not, using the features and the statistical algorithm; and a sentence generating unit extracting sentence units from the document based on a result of the classification of whether the sentence boundary candidate is a sentence boundary or not, wherein the sentence boundary candidate comprises at least one of punctuation marks used in sentence termination, sentence-ending elements of predicates used in the sentence termination, and other sentence-terminating syllables extracted from a list of all syllables used in the sentence termination and pre-extracted from learning data tagged with sentence termination symbols, wherein the document context analyzing unit comprises:
a punctuation mark feature extractor extracting information on whether the sentence boundary candidate is a punctuation mark;
a blank feature extractor extracting information on whether a following syllable of the sentence boundary candidate is a blank;
a syllable feature extractor extracting information on first to n-th preceding syllables of the sentence boundary candidate and information on first to n-th following syllables of the sentence boundary candidate;
a token feature extractor extracting information on first to n-th preceding tokens of the sentence boundary candidate and information on first to n-th following tokens of the sentence boundary candidate; and
a quotation mark feature extractor extracting information on a number of quotation marks existing between a beginning of a target sentence and the sentence boundary candidate.

10. A method for detecting sentence boundaries, comprising:
extracting, by a computer, a sentence boundary candidate from an input document;
extracting features used in two or more statistical algorithms from information on preceding and following contexts of the sentence boundary candidate;
classifying whether the sentence boundary candidate is a sentence boundary or not, using the features and the two or more statistical algorithms; and
extracting sentence units from the document based on a result of the classification of whether the sentence boundary candidate is a sentence boundary or not,
wherein the classifying of whether the sentence boundary candidate is a sentence boundary or not comprises:
classifying whether the sentence boundary candidate is a sentence boundary using the extracted features and a Maximum Entropy (ME) algorithm;
classifying whether the sentence boundary candidate is a sentence boundary using the extracted features and a Support Vector Machine (SVM) algorithm;
classifying whether the sentence boundary candidate is a sentence boundary using the extracted features and a Critical Random Field (CRF) algorithm; and
selecting an optimum classification result from classification results of the ME-based classifier, the SVM-based classifier, and the CRF-based classifier as a final classification result, using the extracted features.

11. The method of claim 10, wherein the extracting of a sentence boundary candidate comprises extracting a punctuation mark used in sentence termination as the sentence boundary candidate.

12. The method of claim 11, wherein the extracting of the sentence boundary candidate further comprises extracting sentence-ending elements from endings of predicates as the sentence boundary candidate, the sentence-ending elements being used in the sentence termination.

13. The method of claim 11, wherein the extracting of the sentence boundary candidate further comprises pre-extracting all syllables used in sentence termination from learning data tagged with sentence termination symbols, and extracting the sentence boundary candidate from a list of the pre-extracted syllables.

14. The method of claim 10, wherein the extracting of features comprises:
extracting information on whether the sentence boundary candidate is a punctuation mark;
extracting information on whether a following syllable of the sentence boundary candidate is a blank;
extracting information on first to n-th preceding syllables of the sentence boundary candidate and information on first to n-th following syllables of the sentence boundary candidate;
extracting information on first to n-th preceding tokens of the sentence boundary candidate and information on first to n-th following tokens of the sentence boundary candidate; and
extracting information on a number of quotation marks existing between a beginning of a target sentence and the sentence boundary candidate.

15. The method of claim 10, wherein the classifying of whether the sentence boundary candidate is a sentence boundary or not comprises:
classifying whether the sentence boundary candidate is a sentence boundary or not using the two or more statistical algorithms; and
selecting an optimum classification result from classification results by the two or more statistical algorithms as a final classification result.

16. The method of claim 10, further comprising correcting an error based on a predetermined rule with respect to the classified sentence boundary candidate, wherein, in the extracting of sentence units, the sentence units are extracted from the document based on the classification result corrected in the correcting of an error.

17. The method of claim 16, wherein the correcting of an error comprises:
detecting whether the sentence boundary candidate is a post-processing target or not, based on the predetermined rule; and
changing the classification result of the sentence boundary candidate into the opposite when the sentence boundary candidate is detected as a post-processing target in the detecting of whether the sentence boundary candidate is a post-processing target or not.

18. A method for detecting sentence boundaries, comprising:
extracting, by a computer, a sentence boundary candidate from an input document;
extracting features from information on preceding and following contexts of the sentence boundary candidate, the features being used in a statistical algorithm;
classifying whether the sentence boundary candidate is a sentence boundary or not, using the features and the statistical algorithm;
correcting an error based on a predetermined rule with respect to the classified sentence boundary candidate; and
extracting sentence units from the document based on a result of the classification of whether the sentence boundary candidate is a sentence boundary or not corrected in the correcting of an error,
wherein the classifying of whether the sentence boundary candidate is a sentence boundary or not comprises:
classifying whether the sentence boundary candidate is a sentence boundary using the extracted features and a Maximum Entropy (ME) algorithm;

classifying whether the sentence boundary candidate is a sentence boundary using the extracted features and a Support Vector Machine (SVM) algorithm;

classifying whether the sentence boundary candidate is a sentence boundary using the extracted features and a Critical Random Field (CRF) algorithm; and selecting an optimum classification result from classification results of the ME-based classifier, the SVM-based classifier, and the CRF-based classifier as a final classification result, using the extracted features.

* * * * *